US007222076B2

(12) United States Patent
Kobayashi et al.

(10) Patent No.: US 7,222,076 B2
(45) Date of Patent: May 22, 2007

(54) SPEECH OUTPUT APPARATUS

(75) Inventors: Erika Kobayashi, Tokyo (JP); Makoto Akabane, Tokyo (JP); Tomoaki Nitta, Tokyo (JP); Hideki Kishi, Tokyo (JP); Rika Horinaka, Tochigi (JP); Masashi Takeda, Tokyo (JP)

(73) Assignee: Sony Corporation, Tokyo (JP)

( * ) Notice: Subject to any disclaimer, the term of this patent is extended or adjusted under 35 U.S.C. 154(b) by 691 days.

(21) Appl. No.: 10/276,935

(22) PCT Filed: Mar. 22, 2002

(86) PCT No.: PCT/JP02/02758

§ 371 (c)(1),
(2), (4) Date: May 9, 2003

(87) PCT Pub. No.: WO02/077970

PCT Pub. Date: Oct. 3, 2002

(65) Prior Publication Data

US 2003/0171850 A1 Sep. 11, 2003

(30) Foreign Application Priority Data

Mar. 22, 2001 (JP) .............................. 2001-82024

(51) Int. Cl.
*G10L 15/00* (2006.01)

(52) U.S. Cl. ...................................................... 704/275

(58) Field of Classification Search ................ 704/270, 704/271, 272, 273, 274, 275, 260
See application file for complete search history.

(56) References Cited

U.S. PATENT DOCUMENTS 4,923,428 A * 5/1990 Curran ....................... 446/175
6,175,772 B1 * 1/2001 Kamiya et al. ............... 700/31
6,772,121 B1 * 8/2004 Kaneko ...................... 704/270

(Continued)

FOREIGN PATENT DOCUMENTS

EP 0 730 261 9/1996

(Continued)

*Primary Examiner*—Daniel Abebe
(74) *Attorney, Agent, or Firm*—Frommer Lawrence & Haug LLP; William S. Frommer; Thomas F. Presson

(57) ABSTRACT

The present invention relates to a voice output apparatus capable of, in response to a particular stimulus, stopping outputting a voice and outputting a reaction. The voice output apparatus is capable of outputting a voice in a natural manner. A rule-based synthesizer 24 produces a synthesized voice and outputs it. For example, when a synthesized voice "Where is an exit" was produced and outputting of the synthesized voice data has proceeded until "Where is an e" has been output, if a user taps a robot, then a reaction generator 30 determines, by referring to a reaction database 31, that a reaction voice "Ouch!" should be output in response to being tapped. The reaction generator 30 then controls an output controller 27 so as to stop outputting the synthesized voice "Where is an exit?" and output the reaction voice "Ouch!". Thereafter, the reaction generator 30 controls the read pointer of a buffer 26 controlled by the read controller 29 such that the outputting of the synthesized voice is resumed from the point at which the outputting was stopped. Thus, the synthesized voice "Where is an e, Ouch!, xit?" is output.

23 Claims, 8 Drawing Sheets

U.S. PATENT DOCUMENTS

2002/0019678 A1 * 2/2002 Mizokawa .................. 700/94

FOREIGN PATENT DOCUMENTS

| | | |
|---|---|---|
| EP | 1 182 645 | 2/2002 |
| JP | 62-227394 | 10/1987 |
| JP | 6-48791 | 7/1994 |
| JP | 9-215870 | 8/1997 |
| JP | 10-328421 | 12/1998 |
| JP | 10-328422 | 12/1998 |
| JP | 2001-92479 | 4/2001 |
| JP | 2001-154681 | 6/2001 |
| JP | 2001-264466 | 9/2001 |
| JP | 2002-14686 | 1/2002 |
| JP | 2002-18147 | 1/2002 |
| JP | 2002-28378 | 1/2002 |
| JP | 2002-49385 | 2/2002 |

* cited by examiner

FIG. 4

| STIMULUS | PART | MAGNITUDE | RANGE | DURATION | STIMULUS RECOGNITION |
|---|---|---|---|---|---|
| PRESSURE | HEAD, TAIL, SHOULDER, BACK, ABDOMEN, LEG, | LOW | BROAD | SHORT | TAP |
| | HEAD, TAIL, SHOULDER, BACK, | VERY LOW | BROAD | LONG | RUB |
| | BACK, SHOULDER, TAIL | HIGH | — | LONG | PUSH |
| | ARM, LEG | HIGH | VERY NARROW | SHORT | STAB |
| | HAND, FOOT, BACK, ABDOMEN, FACE | LOW | BROAD | LONG | SCRUB |
| | FACE, HAND, ARM, LEG | HIGH | NARROW | SHORT | FLICK |
| | ARM, LEG, NECK, FACE | HIGH | NARROW | LONG | PINCH |
| | ARMPIT, FOOT | LOW | NARROW | LONG | TICKLE |
| | BACK, HEAD, FACE, ARM, LEG | HIGH | BROAD | LONG | SCRATCH |

FIG. 6

| RECOGNIZED STIMULUS | REACTION |
|---|---|
| TAP | "OUCH" |
| QUESTION | ??? |
| SLEEPY | YAWN |
| COLD | "AHCHOO" |
| HUNGRY | RUMBLE |
| TOUCHED SOMETHING COLD | "ACK" |
| TOUCHED SOMETHING HOT | "OW" |
| SURPRISED | "EEK" |
| TIRED | PUFF |

SPEECH OUTPUT APPARATUS

TECHNICAL FIELD

The present invention relates to a voice output apparatus, and more particularly, for example, to a voice output apparatus capable of outputting a voice in a more natural fashion.

BACKGROUND ART

In conventional voice synthesizing apparatuses, a synthesized voice is produced on the basis of a text or phonetic symbols obtained by analyzing the text.

In recent years, a pet robot has been proposed which has a voice synthesizer and is capable of speaking to or talking with a user.

In such a pet robot, a voice is synthesized by a voice synthesizer disposed therein in accordance with a text or phonetic symbols corresponding to an utterance to be made, and the resultant synthesized voice is output.

In the pet robot, once the outputting of the synthesized voice is started, the outputting of the synthesized voice is continued until the complete synthesized voice has been output. However, when a user scolds the pet robot when the synthesized voice is being output, if the pet robot continues outputting the synthesized voice, that is, if the pet robot continues uttering, the robot gives a strange impression to the user.

DISCLOSURE OF INVENTION

In view of the above, an object of the present invention is to provide a technique of outputting a voice in a more natural fashion.

According to an aspect of the present invention, there is provided a voice output apparatus comprising voice output means for outputting a voice under the control of an information processing apparatus; stopping means for stopping outputting the voice in response to a particular stimulus; reaction output means for outputting a reaction in response to the particular stimulus; and resuming means for resuming outputting the voice stopped by the stopping means According to another aspect of the present invention, there is provided a method of outputting a voice, comprising the steps of outputting a voice under the control of an information processing apparatus; stopping outputting the voice in response to a particular stimulus; outputting a reaction in response to the particular stimulus; and resuming outputting the voice stopped in the stopping step.

According to another aspect of the present invention, there is provided a program comprising the steps of outputting a voice under the control of an information processing apparatus; stopping outputting the voice in response to a particular stimulus; outputting a reaction in response to the particular stimulus; and resuming outputting the voice stopped in the stopping step.

According to another aspect of the present invention, there is provided a storage medium including a program stored thereon comprising the steps of outputting a voice under the control of an information processing apparatus; stopping outputting the voice in response to a particular stimulus; outputting a reaction in response to the particular stimulus; and resuming outputting the voice stopped in the stopping step.

In the present invention, a voice is output under the control of the information processing apparatus. In response to a particular stimulus, the outputting of the voice is stopped and a reaction corresponding to the particular stimulus is output. Thereafter, the outputting of the stopped voice is resumed.

BRIEF DESCRIPTION OF THE DRAWINGS

FIG. 4 shows a stimulus table.

FIG. 6 shows a reaction table.

BEST MODE FOR CARRYING OUT THE INVENTION

Figure 1:
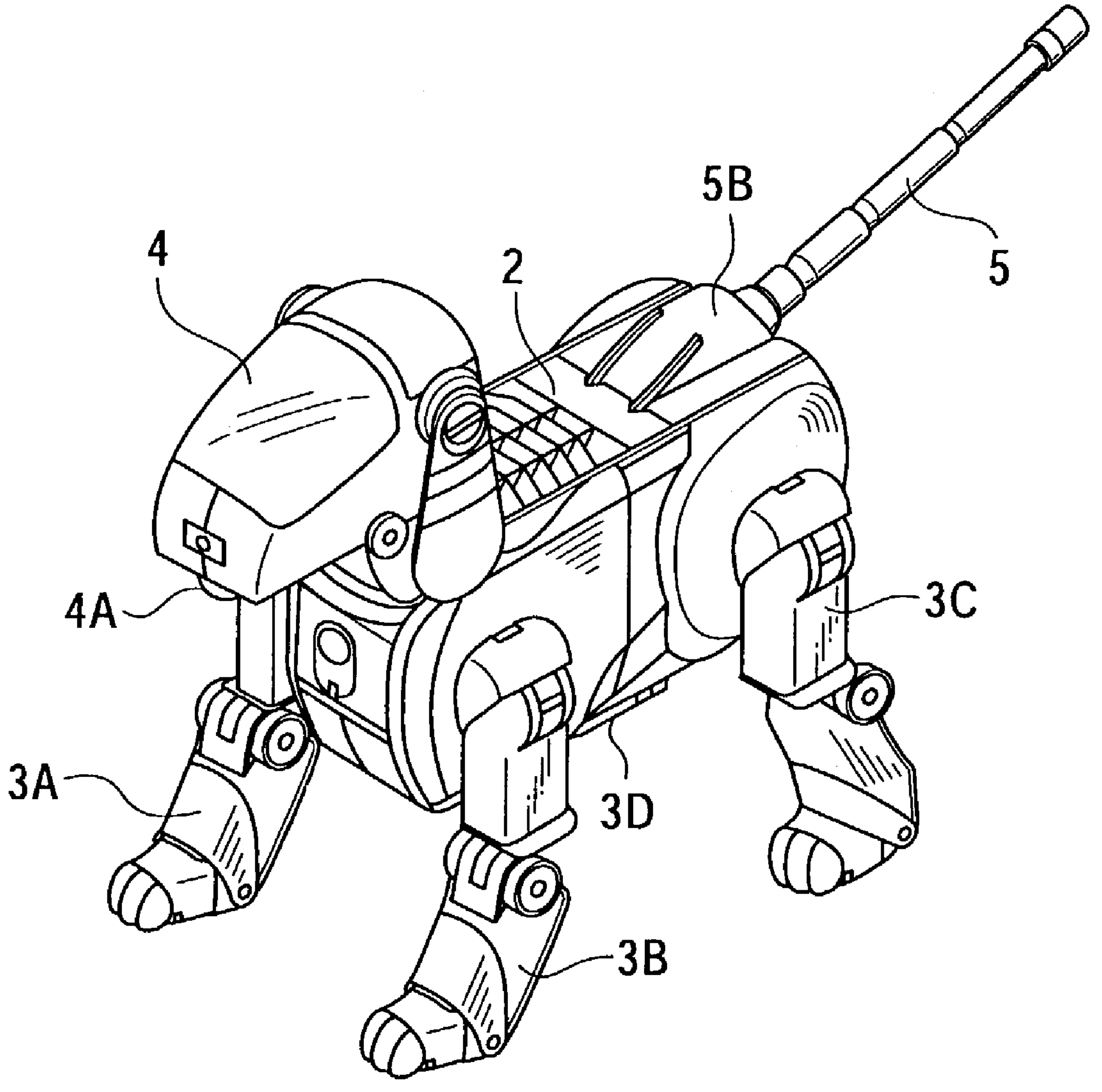
FIG. 1 is a perspective view showing an example of an outward structure of a robot according to an embodiment of the present invention.
Figure 2:
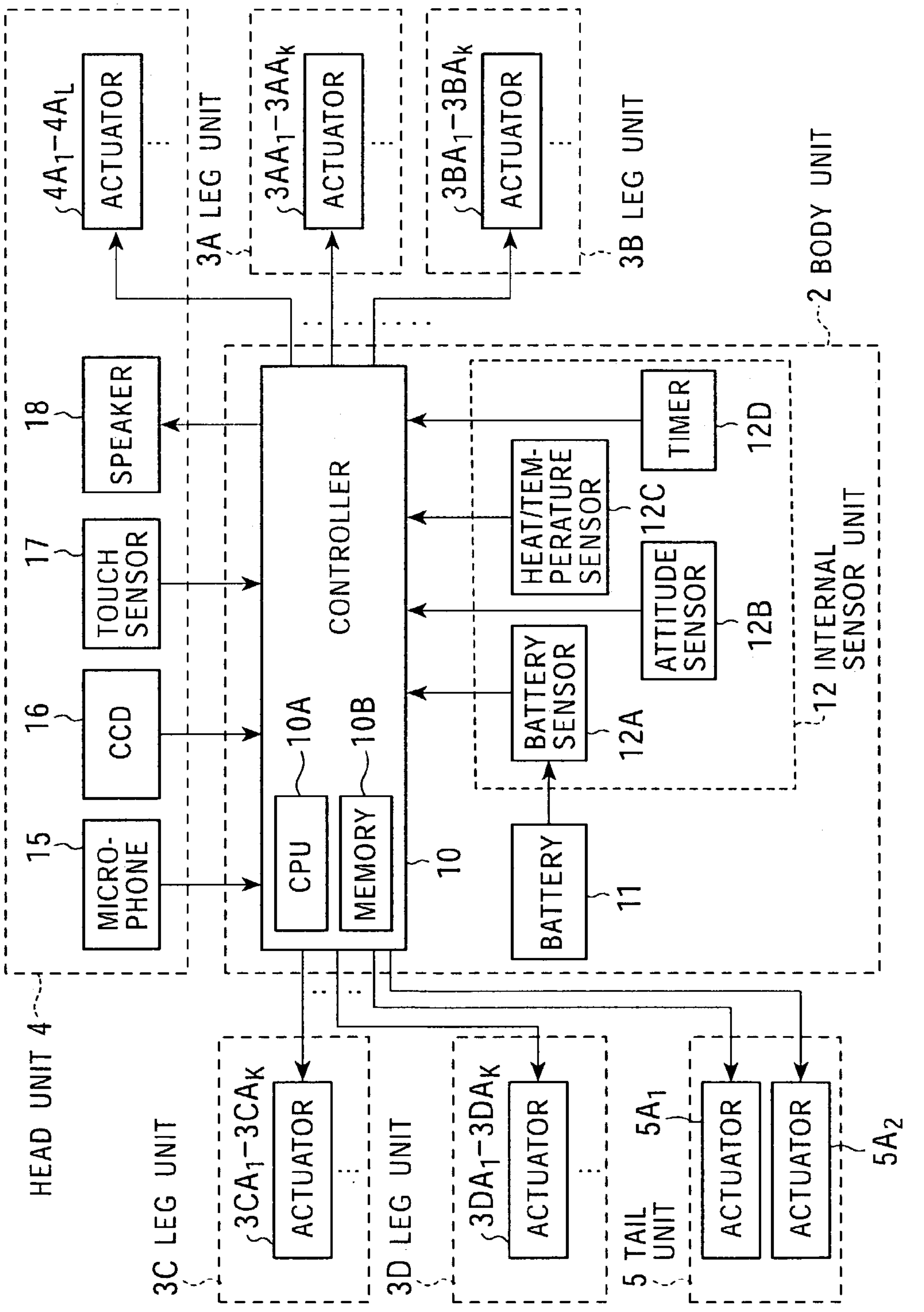
FIG. 2 is a block diagram showing an example of an internal structure of the robot.

FIG. 1 shows an example of an outward structure of a robot according to an embodiment of the present invention, and FIG. 2 shows an example of an electric configuration thereof.

In the present embodiment, the robot is constructed into the form of an animal having four legs, such as a dog, wherein leg units 3A, 3B, 3C, and 3D are attached, at respective four corners, to a body unit 2, and a head unit 4 and a tail unit 5 are attached, at front and bock ends, to the body unit 2.

The tail unit 5 extends from a base 5B disposed on the upper surface of the body unit 2 such that the tail unit 5 can bend or shake with two degree of freedom.

In the body unit 2, as shown in FIG. 2, there are disposed a controller 10 for generally controlling the robot, a battery 11 serving as a power source of the robot, and an internal sensor 12 including a battery sensor 12A, an attitude sensor 12B, a temperature (heat/temperature) sensor 12C, and a timer 12D.

On the head unit 4, as shown in FIG. 2, there are disposed, at properly selected position, a microphone 15 serving as an ear, a CCD (Charge Coupled Device) 16 serving as an eye, a touch sensor (pressure sensor) 17 serving as a sense-of-touch sensor, and a speaker 18 serving as a mouth. A lower jaw unit 4A serving as a lower jaw of the mouth is attached to the head unit 4 such that the lower jaw unit 4A can move with one degree of freedom. The mouth of the robot can be opened and closed by moving the lower jaw unit 4A. In the present embodiment, in addition to the touch sensor disposed on the head unit 4, similar touch sensors are also disposed on various units such as the body unit 2, and the leg units 3A to 3D, although in the embodiment shown in FIG. 2, only one touch sensor 17 disposed on the head unit 4 is shown for simplicity.

As shown in FIG. 2, actuators 3$AA_1$ to 3$AA_K$, 3$BA_1$ to 3$BA_K$, 3$CA_1$ to 3$CA_K$, 3$DA_1$ to 3$DA_K$, 4$A_1$ to 4$A_L$, 5$A_1$, and 5$A_2$ are respectively disposed in joints for joining parts of the leg units 3A to 3D, joints for joining the leg units 3A to 3D with the body unit 2, a joint for joining the head unit 4 with the body unit 2, a joint for joining the head unit 4 with the lower jaw unit 4A, and a joint for joining the tail unit 5 with the body unit 2.

The microphone 15 disposed on the head unit 4 collects a voice (sound) including an utterance of a user from the environment and transmits an obtained voice signal to the controller 10. The CCD camera 16 takes an image (by detecting light) of the environment and transmits an obtained image signal to the controller 10.

The touch sensor 17 (and also the other touch sensors not shown in the figure) detects a pressure applied by the user as a physical action such as "rubbing" or "tapping" and transmits a pressure signal obtained as the result of the detection to the controller 10.

The battery sensor 12A disposed in the body unit 2 detects the remaining capacity of the battery 11 and transmits the result of the detection as a battery remaining capacity signal to the controller 10. The attitude sensor 12B made up of a gyroscope or the like detects the attitude of the robot and supplies information indicating the detected attitude to the controller 10. The temperature sensor 12C detects the ambient temperature and supplies information indicating the detected ambient temperature to the controller 10. The timer 12D measures time using a clock and supplies information indicating the current time to the controller 10.

The controller 10 includes a CPU (Central Processing Unit) 10A and a memory 10B. The controller 10 performs various processes by executing, using the CPU 10A, a control program stored in the memory 10B.

More specifically, the controller 10 detects the environmental state, a command issued from a user, and various stimuli such as an action of the user applied to the robot, on the basis of the voice signal supplied from the microphone 15, the image signal supplied from the CCD camera 16, the pressure signal supplied from the touch sensor 17, and also parameters detected by the internal sensor 12, such as the remaining capacity of the battery 11, the attitude, the temperature, and the current time.

On the basis of the parameters detected above, the controller 10 makes a decision as to how to act next. In accordance with the decision, the controller 10 activates necessary actuators of those including actuators 3$AA_1$ to 3$AA_K$, 3$BA_1$ to 3$BA_K$, 3$CA_1$ to 3$CA_K$, 3$DA_1$ to 3$DA_K$, 4$A_1$ to 4$A_L$, 5$A_1$, and 5$A_2$, so as to nod or shake the head unit 4 or open and close the lower jaw unit 4A. Depending on the situation, the controller 10 moves the tail unit 5 or makes the robot walk by moving the leg units 3A to 3D.

Furthermore, as required, the controller 10 produces synthesized voice data and supplies it to the speaker 18 thereby generating a voice, or turns on/off or blinks LEDs (Light Emitting Diode, not shown in the figures) disposed on the eyes. In the above process, when the synthesized voice is output, the controller 10 moves the lower jaw 4A as required. The opening and closing of the lower jaw 4*a* in synchronization with outputting of the synthesized voice can give the user an impression that the robot is actually speaking.

As described above, the robot autonomously acts in response to the environmental conditions.

Although only one memory 10B is used in the example shown in FIG. 2, one or more memories may be disposed in addition to the memory 10B. Some or all of such memories may be provided in the form of removable memory cards such as memory sticks (trademark) which can be easily attached and detached.

Figure 3:
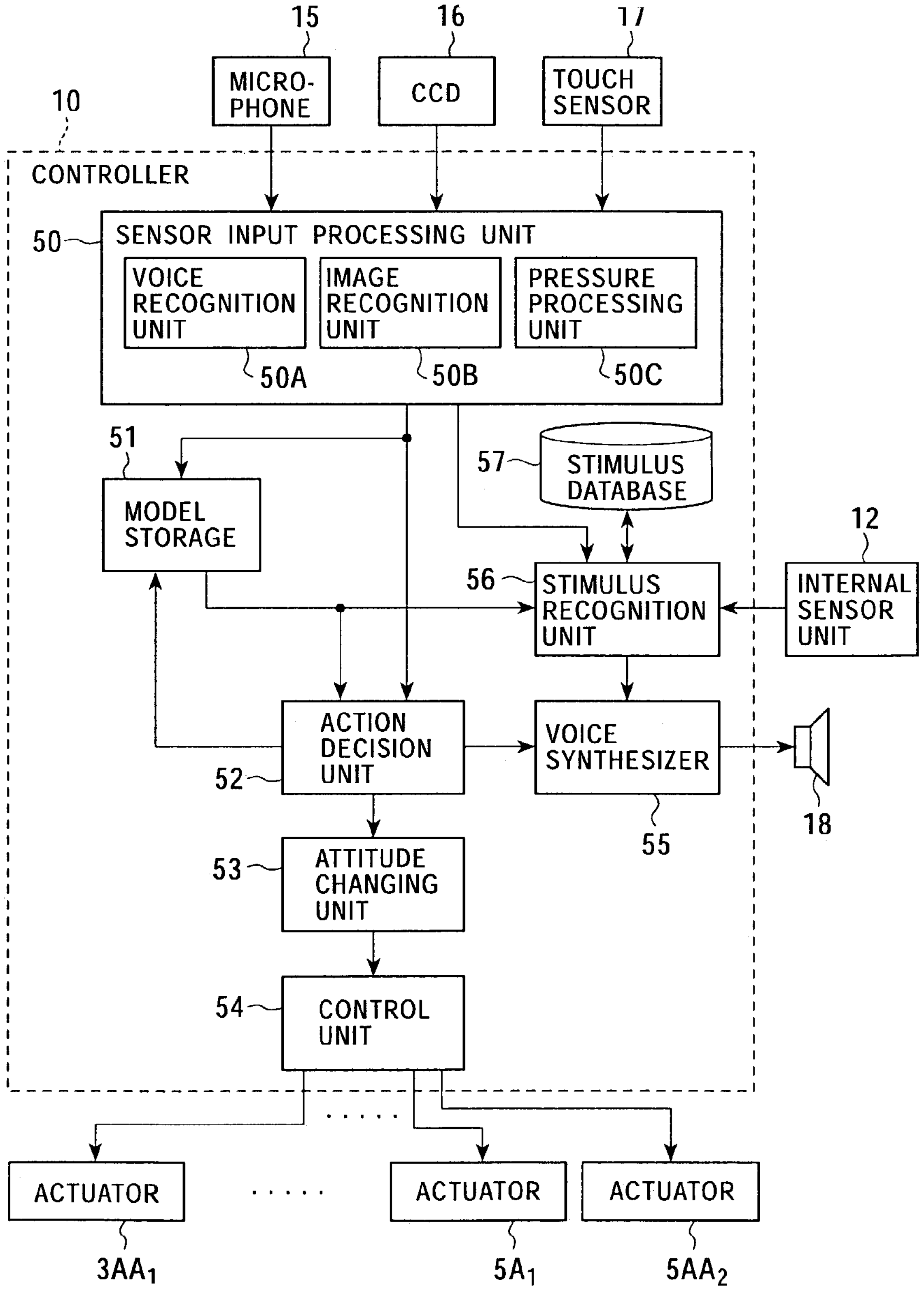
FIG. 3 is a block diagram showing an example of a functional structure of a controller 10.

FIG. 3 shows the functional structure of the controller 10 shown in FIG. 2. Note that the functional structure shown in FIG. 3 is realized by executing, using the CPU 10A, the control program stored in the memory 10B.

The sensor input processing unit 50 detects specific external conditions, an action of a user applied to the robot, and a command given by the user, on the basis of the voice signal, the image signal, and the pressure signal supplied from the microphone 15, the CCD camera 16, and the touch sensor 17, respectively. Information indicating the detected conditions is supplied as recognized-state information to the model memory 51 and the action decision unit 52.

More specifically, the sensor input processing unit 50 includes a voice recognition unit 50A for recognizing the voice signal supplied from the microphone 15. For example, if a given voice signal is recognized by the voice recognition unit 50A as a command such as "walk", "lie down", or "follow the ball", the recognized command is supplied as recognized-state information from the sensor input processing unit 50 to the model memory 51 and the action decision unit 52.

The sensor input processing unit 50 also includes an image recognition unit 50B for recognizing an image signal supplied from the CCD camera 16. For example, if the sensor input processing unit 50 detects, via the image recognition process performed by the image recognition unit 50B, "something red and round" or a "plane extending vertical from the ground to a height greater than a predetermined value", then the sensor input processing unit 50 supplies information indicating the state of the environment such as "there is a ball" or "there is a wall" as recognized-state information to the model memory 51 and the action decision unit 52.

The sensor input processing unit 50 further includes a pressure processing unit 50C for detecting a part to which a pressure is applied, the magnitude of the pressure, a range over which the pressure is applied, and a duration in which the pressure is applied, by analyzing a pressure signal supplied from touch sensors including the touch sensor 17 disposed at various positions on the robot (hereinafter, such touch sensors will be referred to simply as the "touch sensor 17 or the like") For example, if the pressure processing unit 50C detects a pressure higher than a predetermined threshold for a short duration, the sensor input processing unit 50 recognizes that the robot has been "tapped (scolded)". In a case in which the detected pressure is lower in magnitude than a predetermined threshold and long in duration, the sensor input processing unit 50 recognizes that the robot has been "rubbed (praised)". Information indicating the recognized meaning of the pressure applied to the robot is supplied as recognized-state information to the model memory 51 and the action decision unit 52.

In the sensor input processing unit 50, the result of the voice recognition performed by the voice recognition unit 50A, the result of the image recognition performed by the image recognition unit 50B, and the result of the pressure analysis performed by the pressure processing unit 50C are also supplied to a stimulus recognition unit 56.

The model memory 51 stores and manages an emotion model, an instinct model, and a growth model representing the internal state of the robot concerning emotion, instinct, and growth, respectively.

The emotion model represents the state (degree) of emotion concerning, for example, "happiness", "sadness", "angriness", and "pleasure" using values within predetermined ranges, wherein the values are varied depending on the recognized-state information supplied from the sensor input processing unit 50 and depending on the passage of time. The instinct model represents the state (degree) of instinct concerning, for example, "appetite", "desire for sleep", and "desire for exercise" using values within predetermined ranges, wherein the values are varied depending on the recognized-state information supplied from the sensor input processing unit 50 and depending on the passage of time. The growth model represents the state (degree) of growth, such as "childhood", "youth", "middle age" and "old age" using values within predetermined ranges, wherein the values are varied depending on the recognized-state information supplied from the sensor input processing unit 50 and depending on the passage of time.

The states of emotion, instinct, and growth, represented by values of the emotion model, the instinct model, and the growth model, respectively, are supplied as state information from the model memory 51 to the action decision unit 52.

In addition to the recognized-state information supplied from the sensor input processing unit 50, the model memory 51 also receives, from the action decision unit 52, action information indicating a current or past action of the robot, such as "walked for a long time", thereby allowing the model memory 51 to produce different state information for the same recognized-state information, depending on the robot's action indicated by the action information.

More specifically, for example, when the robot greets the user, if the user rubs the head of the robot, then action information indicating that the robot greeted the user and recognized-state information indicating that the head was rubbed are supplied to the model memory 51. In response, the model memory 51 increases the value of the emotion model indicating the degree of happiness.

On the other hand, if the robot is rubbed on the head when the robot is doing a job, action information indicating that the robot is doing a job and recognized-state information indicating that the head was rubbed are supplied to the model memory 51. In this case, the model memory 51 does not increase the value of the emotion model indicating the degree of "happiness".

As described above, the model memory 51 sets the values of the emotion model on the basis of not only the recognized-state information but also the action information indicating the current or past action of the robot. This prevents the robot from having an unnatural change in emotion. For example, even if the user rubs the head of the robot with intension of playing a trick on the robot when the robot is doing some task, the value of the emotion model associated with "happiness" is not increased unnaturally.

For the instinct model and the growth model, the model memory 51 also increases or decreases the values on the basis of both the recognized-state information and the action information, as with the emotion model. Furthermore, when the model memory 51 increases or decreases a value of one of the emotion model, the instinct model, and the growth model, the values of the other models are taken into account.

The action decision unit 52 decides an action to be taken next on the basis of the recognized-state information supplied from the sensor input processing unit 50, the state information supplied from the model memory 51, and the passage of time. The content of the decided action is supplied as action command information to the attitude changing unit 53.

More specifically, the action decision unit 52 manages a finite automaton, which can take states corresponding to the possible actions of the robot, as an action model which determines the action of the robot such that the state of the finite automaton serving as the action model is changed depending on the recognized-state information supplied from the sensor input processing unit 50, the values of the model memory 51 associated with the emotion model, the instinct model, and the growth model, and the passage of time, and the action decision unit 52 employs the action corresponding to the changed state as the action to be taken next.

In the above process, when the action decision unit 52 detects a particular trigger, the action decision unit 52 changes the state. More specifically, the action decision unit 52 changes the state, for example, when the period of time in which the action corresponding to the current state has been performed has reached a predetermined value, or when specific recognized-state information has been received, or when the value of the state of the emotion, instinct, or growth indicated by the state information supplied from the model memory 51 becomes lower or higher than a predetermined threshold.

Because, as described above, the action decision unit 52 changes the state of the action model not only depending on the recognized-state information supplied from the sensor input processing unit 50 but also depending on the values of the emotion model, the instinct model, and the growth model of the model memory 51, the state to which the current state is changed can be different depending on the values (state information) of the emotion model, the instinct model, and the growth model even when the same recognized-state information is input.

For example, when the state information indicates that the robot is not "angry" and is not "hungry", if the recognized-state information indicates that "a user's hand with its palm facing up is held in front of the face of the robot", the action decision unit 52 produces, in response to the hand being held in front of the face of the robot, action command information indicating that shaking should be performed and transmits it to the attitude changing unit 53.

On the other hand, for example, when the state information indicates that the robot is not "angry" but "hungry", if the recognized-state information indicates that "a user's hand with its palm facing up is held in front of the face of the robot", the action decision unit 52 produces, in response to the hand being held in front of the face of the robot, action command information indicating that the robot should lick the palm of the hand and transmits it to the attitude changing unit 53.

When the state information indicates that the robot is angry, if the recognized-state information indicates that "a user's hand with its palm facing up is held in front of the face of the robot", the action decision unit 52 produces action command information indicating that the robot should turn its face aside regardless of whether the state information indicates that the robot is or is not "hungry", and the action decision unit 52 transmits the produced action command information to the attitude changing unit 53.

Furthermore, on the basis of the states of emotion, instinct, and growth indicated by state information supplied from the model memory 51, the action decision unit 52 may determine action parameters associated with, for example, the walking pace or the magnitude and speed of moving forelegs and hind legs which should be employed in a state to which the current state is to be changed. In this case, action command information including the action parameters is supplied to the attitude changing unit 53.

In addition to the above-described action command information associated with motions of various parts of the robot such as the head, forelegs, hind legs, etc., the action decision unit 52 also produces action command information for causing the robot to utter. The action command information for causing the robot to utter is supplied to the voice synthesizing unit 55. The action command information supplied to the voice synthesizing unit 55 includes a text or the like corresponding to a voice to be synthesized by the voice synthesis unit 55. If the voice synthesis unit 55 receives the action command information from the action decision unit 52, the voice synthesis unit 55 produces a synthesized voice in accordance with the text included in the action command information and supplies it to the speaker 18, which in turns outputs the synthesized voice. Thus, for example, the speaker 18 outputs a voice of a cry, a voice "I am hungry" to request the user for something, or a voice "What?" to respond to a call from the user.

The voice synthesis unit 55 also receives information indicating the meaning of a stimulus recognized by the stimulus recognition unit 56 which will be described later. In addition to producing a synthesized voice in accordance with action command information received from the action decision unit 52 as described above, the voice synthesis unit 55 also stops outputting the synthesized voice depending on the meaning of a stimulus recognized by the stimulus recognition unit 56. In this case, if required, the voice synthesis unit 55 synthesizes a reaction voice in response to the recognized meaning and outputs it. Thereafter, as required, the voice synthesis unit 55 resumes outputting the stopped synthesized voice.

In accordance with the action command information supplied from the action decision unit 52, the attitude changing unit 53 produces attitude change command information for changing the attitude of the robot from the current attitude to a next attitude and transmits it to the control unit 54.

Possible attitudes to which the attitude of the robot can be changed from the current attitude depend on the shapes and weights of various parts of the robot such as the body, forelegs, and hind legs and also depend on the physical state of the robot such as coupling states between various parts. Furthermore, the possible attitudes also depend on the states of the actuators 3AA$_1$ to 5A$_1$, and 5A$_2$, such as the directions and angles of the joints.

Although direct transition to the next attitude is possible in some cases, direct transition is impossible depending on the next attitude. For example, the robot having four legs can change the attitude from a state in which the robot lies sideways with its legs fully stretched directly into a lying-down state but cannot directly into a standing-up state. In order to change the attitude into the standing-up state, it is necessary to perform a two-step operation including changing the attitude into the lying-down attitude by drawing in the legs and then standing up. Some attitudes are not easy to change thereinto. For example, if the robot having four legs tries to raise its two forelegs upward from an attitude in which the robot stands with its four legs, the robot will easily fall down.

To avoid the above problem, the attitude changing unit 53 registers, in advance, attitudes which can be achieved by means of direct transition. If the action command information supplied from the action decision unit 52 designates an attitude which can be achieved by means of direct transition, the attitude changing unit 53 transfers the action command information as attitude change command information to the control unit 54. However, in a case in which the action command information designates an attitude which cannot be achieved by direct transition, the attitude changing unit 53 produces attitude change command information indicating that the attitude should be first changed into a possible intermediate attitude and then into a final attitude, and the attitude changing unit 53 transmits the produced attitude change command information to the control unit 54. This prevents the robot from trying to change its attitude into an impossible attitude or from falling dawn.

In accordance with the attitude change command information received from the attitude changing unit 53, the control unit 54 produces a control signal for driving the actuators 3AA$_1$ to 5A$_1$ and 5A$_2$ and transmits it to the actuators 3AA$_1$ to 5A$_1$ and 5A$_2$. Thus, in accordance with the control signal, the actuators 3AA$_1$ to 5A$_1$ and 5A$_2$ are driven such that the robot acts autonomously.

The stimulus recognition unit 56 recognizes the meaning of a stimulus applied from the outside or inside of the robot by referring to the stimulus database 57 and supplies information indicating the recognized meaning to the voice synthesis unit 55. More specifically, as described earlier, the stimulus recognition unit 56 receives, from the sensor input processing unit 50, the result of the voice recognition performed by the voice recognition unit 50A, the result of the image recognition performed by the image recognition unit 50B, and the result of the pressure analysis performed by the pressure processing unit 50C, and also receives the output from the internal sensor unit 12 and the values stored in the model memory 51 associated with the emotion model, the instinct model, and the growth model. On the basis of these pieces of information input to the stimulus recognition unit 56, the stimulus recognition unit 56 recognizes the meaning of the stimulus applied from the outside or the inside by referring to the stimulus database 57.

The stimulus database 57 stores a stimulus table indicating the correspondence between a stimulus and the meaning of the stimulus for each stimulus type such as the sound, light (image), and pressure.

FIG. 4 shows an example of the stimulus table in which the correspondence is described for stimuli of the stimulus type of pressure.

In the example shown in FIG. 4, parameters associated with the pressure applied as the stimulus are defined in terms of a part to which the pressure is applied, the magnitude (strength), the range, and the duration (in which the pressure is applied), and meanings are defined for respective pressures having various values of parameters. For example, in a case in which a strong pressure is applied to the head, tail, shoulders, back, abdomens, or legs over a wide range for a short time, the values of parameters of the applied pressure match those in the first row of the stimulus table shown in FIG. 4, and thus the stimulus recognition unit 56 recognizes the meaning of the pressure as "tap", that is, the stimulus recognition unit 56 recognizes that a user has applied a pressure to the robot with the intention of tapping the robot.

In the above process, the stimulus recognition unit 56 determines the type of stimulus based on which of stimulus detection units the stimulus has been supplied from, wherein the stimulus detection units include the battery sensor 12A, the attitude sensor 12B, the temperature sensor 12C, the timer 12D, the voice recognition unit 50A, the image recognition unit 50B, the pressure processing unit 50C, and the model memory 51.

The stimulus recognition unit 56 may be formed such that some parts of the sensor input processing unit 50 are shared by the stimulus recognition unit 56 and the sensor input processing unit 50.

Figure 5:
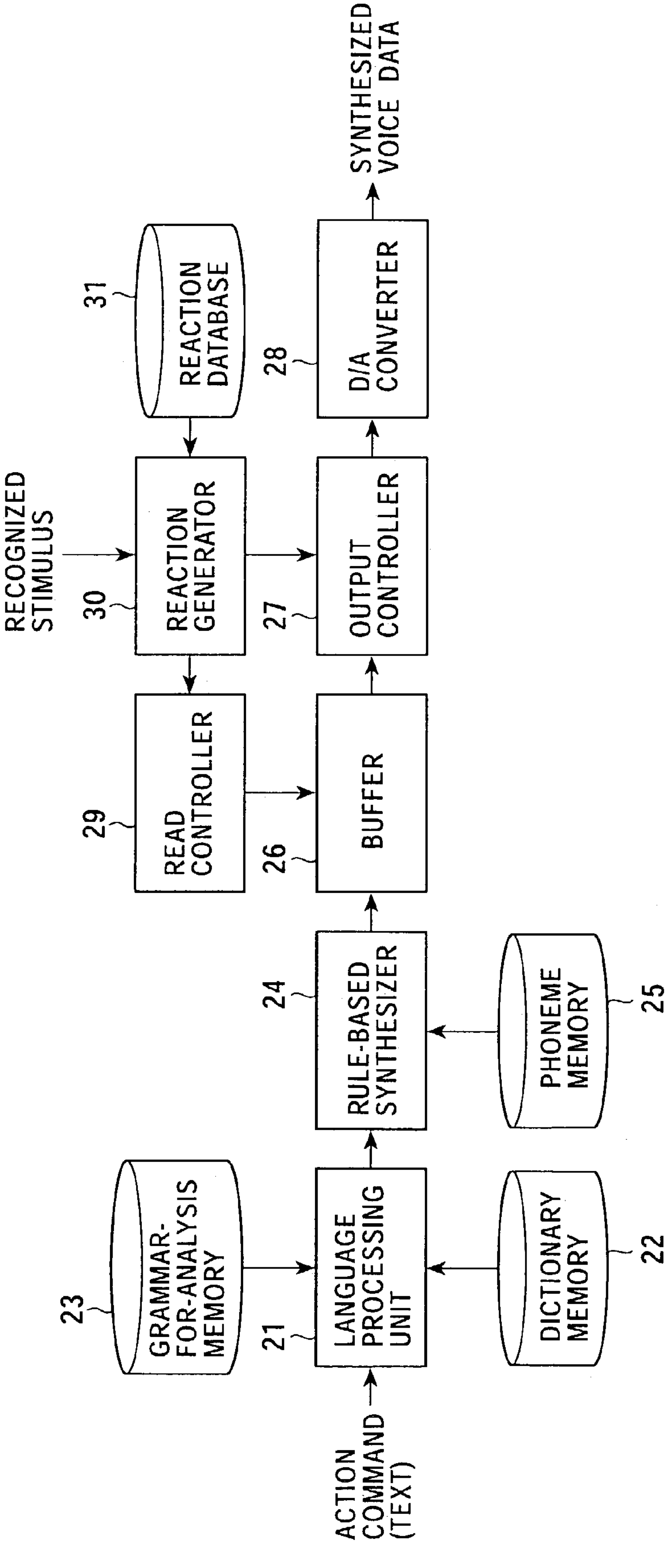
FIG. 5 is a block diagram showing an example of a construction of a voice synthesis unit 55.

FIG. 5 shows an example of a construction of the voice synthesis unit 55 shown in FIG. 3.

Action command information, which is output from the action decision unit 52 and which includes a text on the basis of which a voice is to be synthesized, is supplied to the language processing unit 21. Upon receiving the action command information, the language processing unit 21 analyzes the text included in the action command information by-referring to the dictionary memory 22 and the grammar-for-analysis memory 23.

The dictionary memory 22 stores a word dictionary indicating information associated with the parts of speech, pronunciations, accents of respective words. The grammar-for-analysis memory 23 stores grammar for analysis indicating rules such as restriction of word concatenation for the respective words described in the word dictionary stored in the dictionary memory 22. In accordance with the word dictionary and the grammar for analysis described above, the language processing unit 21 performs text analysis such as morphological analysis and syntax analysis on a given text and extracts information necessary in by-rule voice synthesis performed later by the rule-based synthesizer 24. More specifically, for example, information necessary in the by-rule voice synthesis includes pause positions, prosody information for controlling accents, intonations, and power, and pronunciation information indicating pronunciations of words.

The information obtained by the language processing unit 21 is supplied to the rule-based synthesizer 24. The rule-based synthesizer 24 refers to the phoneme memory 25 and produces synthesized voice data (digital data) corresponding to the text input to the language processing unit 21.

The phoneme memory 25 stores phoneme data in the form of, for example, CV (Consonant, Vowel), VCV, CVC, or one pitch. In accordance with the information supplied from the language processing unit 21, the rule-based synthesizer 24 concatenates necessary phoneme data and adds pauses, accents, and intonations thereto by processing the waveform of the phoneme data thereby producing voice data of synthesized voices (synthesized voice data) corresponding to the text input to the language processing unit 21.

The synthesized voice data produced in the above-described manner is supplied to the buffer 26. The buffer 26 temporarily stores the synthesized voice data supplied from the rule-based synthesizer 24. The buffer 26 reads the synthesized voice data stored therein under the control of the read controller 29 and supplies the read data to the output controller 27.

The output controller 27 controls outputting the synthesized voice data from the buffer 26 to the D/A (Digital/Analog) converter 27. The output controller 27 also controls outputting of data (reaction voice data) indicating a voice to be uttered in response to a stimulus from the reaction generator 30 to the D/A converter 28.

The D/A converter 28 converts the synthesized voice data or the reaction voice data supplied from the output controller 27 from a digital signal into an analog signal and supplies the resultant analog signal to the speaker 18, which in turn outputs the supplied analog signal.

The read controller 29 controls reading the synthesized voice data from the buffer under the control of the reaction generator 30. More specifically, the read controller 29 sets a read pointer indicating a read address at which the synthesized voice data is read from the buffer 26, and the read controller 29 sequentially shifts the read pointer so that the synthesized voice data is properly read from the buffer 26.

The information indicating the meaning of the stimulus recognized by the stimulus recognition unit 56 is supplied to the reaction generator 30. If the reaction generator 30 receives the information indicating the meaning of the stimulus from the stimulus recognition unit 56, the reaction generator 30 refers to the reaction database 31 and determines whether to output a reaction in response to the stimulus. If it is determined that a reaction should be output, the reaction generator 30 further determines what reaction should be output. In accordance with the decisions, the reaction generator 30 controls the output controller 27 and the read controller 29.

The reaction database 31 stores a reaction table indicating the correspondence between the meaning of stimulus and the reaction.

FIG. 6 shows a reaction table. In accordance with the reaction table shown in FIG. 6, for example, if the recognized meaning of a given stimulus is "tap", then "Ouch!" is output as a reaction voice.

Referring to a flow chart shown in FIG. 7, a voice synthesis process performed by the voice synthesis unit 55 shown in FIG. 6 is described below.

If the voice synthesis unit 55 receives action command information from the action decision unit 52, the voice synthesis unit 55 starts the process. First, in step S1, the action command information is supplied to the language processing unit 21.

The process then proceeds to step S2. In step S2, in the language processing unit 21 and the rule-based synthesizer 24, synthesized voice data is produced in accordance with the action command received from the action decision unit 52.

More specifically, the language processing unit 21 analyzes a text included in the action command by referring to the dictionary memory 22 or the grammar-for-analysis memory 23. The result of the analysis is supplied to the rule-based synthesizer 24. On the basis of the result of analysis received from the language processing unit 21, the rule-based synthesizer unit 24 refers to the phoneme memory 25 and produces synthesized voice data corresponding to the text included in the action command.

The synthesized voice data produced by the rule-based synthesizer unit 24 is supplied to the buffer 26 and stored therein.

The process then proceeds to step S3. In step S3, the read controller 29 starts reading the synthesized voice data stored in the buffer 26.

More specifically, the read controller 29 sets the read pointer so as to point to the beginning of the synthesized voice data stored in the buffer 26, and the read controller 29 sequentially shifts the read pointer so that the synthesized voice data stored in the buffer 26 is read from the beginning thereof and supplied to the output controller 27. The output controller 27 supplies the synthesized voice data read from the buffer 26 to the speaker 18 via the D/A converter 28 thereby outputting the data from the speaker 18.

Thereafter, the process proceeds to step S4. In step S4, the reaction generator 30 determines whether information indicating the recognized meaning of a stimulus has been transmitted from the stimulus recognition unit 56 (FIG. 3). The stimulus recognition unit 56 recognizes the meaning of stimulus at regular or irregular intervals and supplies information indicating the result of recognition to the reaction generator 30. Alternatively, the stimulus recognition unit 56 always recognizes the meaning of stimulus, and if the stimulus recognition unit 56 detects a change in the recognized meaning, the stimulus recognition unit 56 supplies the information indicating the meaning recognized after the change to the reaction generator 30.

In a case in which it is determined in step S4 that information indicating the recognized meaning of stimulus has been transmitted from the stimulus recognition unit 56, the reaction generator 30 receives the information indicating the recognized meaning. Thereafter, the process proceeds to step S5.

In step S5, the reaction generator 30 searches the reaction table stored in the reaction database 31 using the meaning of the recognized meaning received from the stimulus recognition unit 56 as a search key. Thereafter, the process proceeds to step S6.

In step S6, on the basis of the result of searching of the reaction table performed in step S5, the reaction generator 30 determines whether to output a reaction voice. If it is determined in step S6 that no reaction voice is to be output, that is, for example, if no reaction corresponding to the meaning of the stimulus given from the stimulus recognition unit 56 is found in the reaction table (the meaning of the stimulus given by the stimulus recognition unit 56 is not registered in the reaction table), the flow returns to step S4 to repeat the process described above.

In this case, outputting of the synthesized voice data from the buffer 26 is continued.

On the other hand, if it is determined in step S6 that a reaction voice should be output, that is, for example, if a reaction corresponding to the meaning of the stimulus given from the stimulus recognition unit 56 is found in the reaction table, the reaction generator 30 reads the corresponding reaction voice data from the reaction database 31. Thereafter, the process proceeds to step S7.

In step S7, the reaction generator 30 controls the output controller 27 so as to stop supplying the synthesize voice data from the buffer 27 to the D/A converter 28.

Thus, in this case, the outputting of the synthesized voice data is stopped.

Furthermore, in this step S7, the reaction generator 30 supplies an interrupt signal to the read controller 29 to acquire the value of the read pointer at the time at which the outputting of the synthesized voice data is stopped. Thereafter, the process proceeds to step S8.

In step S8, the reaction generator 30 supplies the reaction voice data obtained in step S5 via the retrieval of the reaction table to the output controller 27 and further to the D/A converter 28 via the output controller 27.

Thus, after the outputting of the synthesized voice data is stopped, the reaction voice data is output.

After starting outputting the reaction voice data, the process proceeds to step S9 in which the reaction generator 30 sets the read pointer so as to point to an address from which the reading of the synthesized voice data is to be resumed. Thereafter, the process proceeds to step S10.

In step S10, the process waits for completion of the outputting of the reaction voice data started in step S8. If the outputting of the reaction voice data is completed, the process proceeds to step S11. In step S11, the reaction generator 30 supplies the data indicating the value of the read pointer set in step S9 to the read controller 29. In response, the read controller 29 resumes the reproducing (reading) of the synthesized voice data from the buffer 26.

Thus, when the outputting of the reaction voice data started after stopping the outputting of the synthesized voice data is completed, the outputting of the synthesized voice data is resumed.

Thereafter, the process returns to step S4. If it is determined in step S4 that no information indicating the recognized meaning of stimulus has been transmitted from the stimulus recognition unit 56, the process jumps to step S12. In step S12, it is determined whether there is more synthesized voice data to be read from the buffer 26. If it is determined that there is more synthesized voice data to be read, the process returns to step S4.

In a case in which it is determined in step S12 that there is no more synthesized voice data to be read from the buffer 26, the process is completed.

Via the voice synthesis process described above, a voice is output, for example, as described below.

Herein, we assume that a synthesized voice data "Where is an exit?" was produced by the rule-based synthesizer 24 and stored in the buffer 26. We also assume that a user tapped the robot when the outputting of the synthesized voice data proceeded to "Where is an e". In this case, the stimulus recognition unit 56 recognizes that the meaning of the applied stimulus is "tap" and supplies information indicating the recognized meaning of the stimulus to the reaction generator 30. The reaction generator 30 refers to the reaction table shown in FIG. 6 and determines that a reaction voice data "Ouch!" is to be output in response to the stimulus recognized as having the meaning of "tap".

The reaction generator 30 then controls the output controller 27 so as to stop outputting the synthesized voice data and output the reaction voice data "Ouch!". Thereafter, the reaction generator 30 controls the read pointer so as to resume outputting the synthesized voice data from the point at which the outputting was stopped.

More specifically, in this case, when the outputting of the synthesized voice data proceeds until "Where is an e" has been output, the outputting of the synthesized voice data is stopped and the reaction voice "Ouch!" is output in response to detecting that the robot has been tapped by the user. Thereafter, the remaining part of the synthesized voice data, "xit, is output.

In this specific example, synthesized voice is output such that "Where is an e"→"Ouch!"→"xit". Because the synthesized voice data "xit" output after the reaction voice data "Ouch!" is a part of a complete word, the user cannot easily understand the uttered voice.

In order to avoid the above problem, the point from which the outputting of the synthesized voice data is resumed may be shifted back to an earlier point corresponding to a boundary between information segments (for example, to a point corresponding to the beginning of a first information segment which will be reached when the restarting point is shifted back).

That is, the outputting of the synthesized voice data may be resumed from a boundary of a word which will be first detected when the resuming point is shifted back from the stopped point.

In the specific example described above, the outputting of the synthesized voice data was stopped at "x" of the word "exit", and thus the outputting of the synthesized voice data may be resumed from the beginning of the word "exit". In this case, when the outputting of the synthesized voice data proceeds until "Where is an e" has been output, the outputting of the synthesized voice data is stopped and the reaction voice "Ouch!" is output in response to detecting that the robot has been tapped by the user. Thereafter, the synthesized voice data "exit" is output.

The point from which the outputting of the synthesized voice data is resumed may be shifted back to a punctuation or a breathing pause which will be first detected when the resuming point is shifted back from the stopped point. Alternatively, the point from which the outputting of the synthesized voice data may be arbitrarily specified by the user by operating an operation control unit which is not shown in the figure.

Figure 7:
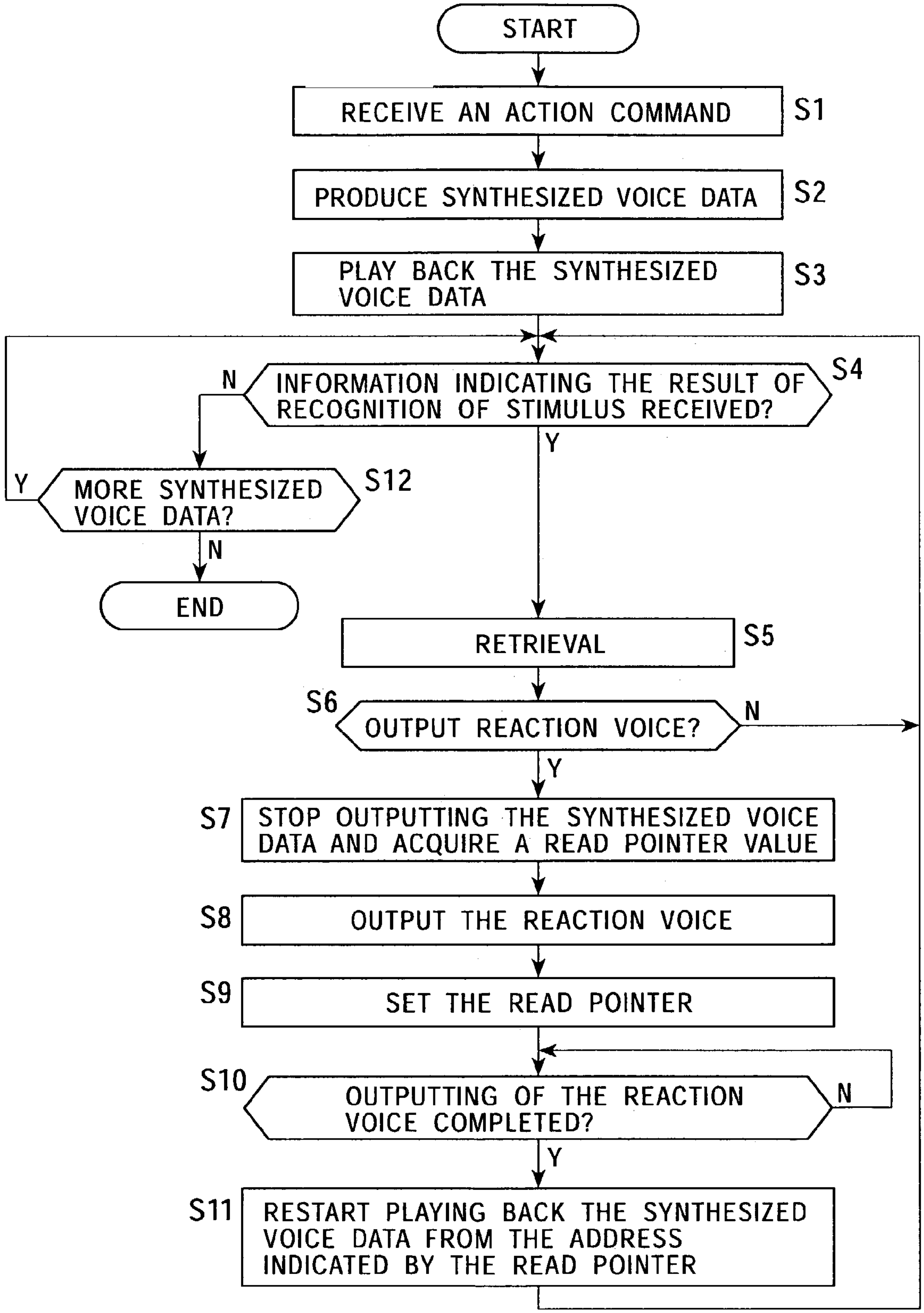
FIG. 7 is a flow chart showing a process associated with the voice synthesis unit 55.

More specifically, the point from which the outputting of the synthesized voice data is resumed can be specified by setting, in step S9 shown in FIG. 7, the read pointer to a corresponding value.

In the example described above, when a stimulus is applied, the outputting of the synthesized voice data is stopped and the reaction voice data corresponding to the applied stimulus is output, and immediately thereafter, the outputting of the synthesized voice data is resumed. Alternatively, after outputting the reaction voice data, the outputting of the synthesized voice data may not immediately resumed but may be resumed after a predetermined fixed reaction is output.

More specifically, after the outputting of the synthesized voice data is stopped and the reaction voice data "Ouch!" is output as described above, a fixed synthesized voice such as "Excuse me" or "I beg your pardon" is output to apologize for stopping outputting of the synthesized voice data. Thereafter, the outputting of the stopped synthesized voice data is resumed.

The outputting of the synthesized voice data may be resumed from the beginning thereof.

For example, if a voice indicating a question such as "Eh!" uttered by the user is detected in the middle of the process of outputting the synthesized voice data, it can be concluded that the user could not catch the synthesized voice. Thus, in this case, the outputting of the synthesized voice data may be stopped in response to the detection of the voice stimulus "Eh!", and the synthesized voice data may be output again from its beginning after a short silent period. The resuming outputting the synthesized voice data can also be easily accomplished by setting the read pointer to a corresponding value.

The controlling outputting the synthesized voice data may also be performed in response to a stimulus other than a pressure or a voice.

For example, the stimulus recognition unit 56 compares a temperature stimulus output from the temperature sensor 12C of the internal sensor unit 12 with a predetermined threshold, and if the temperature is lower than the predetermined threshold, the stimulus recognition unit 56 recognizes that it "colds". In the case in which the stimulus recognition unit 56 recognizes that it "colds", the reaction generator 30 may output a reaction voice data corresponding to, for example, a sneeze to the output controller 27. In this case, the robot sneezes in the middle of the process of outputting the synthesized voice data and then resumes outputting the synthesized voice data.

As another example, when the stimulus recognition unit 56 compares the current time output as a stimulus from the timer 12D of the internal sensor unit 12 (or the value indicating the degree of "desire for sleep" determined by the instinct model stored in the model memory 51) with a predetermined threshold value, if the current time is within a range corresponding to early morning or midnight, the stimulus recognition unit 56 recognizes that the robot is "sleepy". In the case in which the stimulus recognition unit 56 has recognized that the robot is "sleepy", the reaction generator 30 may output a reaction voice data corresponding to, for example, a yawn to the output controller 27. In this case, the robot yawns in the middle of the process of outputting the synthesized voice data and then resumes outputting the synthesized voice data.

As still another example, when the stimulus recognition unit 56 compares the remaining capacity of the battery output as a stimulus from the battery sensor 12A of the internal sensor unit 12 (or the value indicating the degree of "appetite" determined by the instinct model stored in the model memory 51) with a predetermined threshold value, if the remaining capacity of the battery is lower than the predetermined threshold, the stimulus recognition unit 56 recognizes that the robot is "hungry". In the case in which the stimulus recognition unit 56 has recognized that the robot is "hungry", the reaction generator 30 may output a reaction voice data indicating, for example, a "rumbling" sound to the output controller 27. In this case, the stomach of the robot rumbles in the middle of the process of outputting the synthesized voice data and then resumes outputting the synthesized voice data.

As still another example, when the stimulus recognition unit 56 compares the value indicating the degree of "desire for exercise" determined by the instinct model stored in the model memory 51 with a predetermined threshold value, if the value indicating the degree of "desire for exercise" is lower than the predetermined threshold, the stimulus recognition unit 56 recognizes that the robot is "tired". In the case in which the stimulus recognition unit 56 has recognized that the robot is "tired", the reaction generator 30 may produce a reaction voice data indicating a sighing voice such as "Whew" to represent tiredness and output it to the output controller 27. In this case, the robot sighs in the middle of the process of outputting the synthesized voice data and then resumes outputting the synthesized voice data.

As still another example, on the basis of the output from the attitude sensor 12B, it may be determined whether the robot is going to lose its balance in attitude. If it is determined that the robot is going to lose its balance, a reaction voice data indicating a voice such as "Oops!" may be output.

As described above, in response to a stimulus applied from the outside or the inside of the robot, outputting of synthesized voice data is stopped and a reaction corresponding to the applied stimulus is output. Thereafter, outputting of the stopped synthesized voice data is resumed. Thus, it is possible to realize a robot capable of uttering in a very natural manner with feelings and senses similar to human feelings and senses, that is, capable of behaving in a similar manner as a human being. That is, the robot is capable of behaving in a manner which gives the impression that the robot behaves by means of spinal reflex, and thus the robot can give good entertainment to users.

Furthermore, by shifting back the resuming point of outputting synthesized voice data from the stopped point, it becomes possible to prevent the user from missing the meaning of the utterance because of stopping outputting the synthesized voice data before the end of the synthesized voice data.

Although the present invention has been described above with reference to embodiments of the tetrapod robot for entertainment (the robot serving as a pseudo-pet), the present invention may also be applied to other types of robots such as a bipedal robot having a shape similar to a human being. Furthermore, the present invention can be applied not only to actual robots that act in the real world but also to virtual robots (characters) such as that displayed on a display such as a liquid crystal display. Furthermore, the present invention can be applied not only to robots but also to various systems such as an interactive system in which a voice synthesis apparatus or a voice output apparatus is provided.

In the embodiments described above, a sequence of processing is performed by executing the program using the CPU 10A. Alternatively, the sequence of processing may also be performed by dedicated hardware.

The program may be stored, in advance, in the memory 10B (FIG. 2). Alternatively, the program may be stored (recorded) temporarily or permanently on a removable storage medium such as a floppy disk, a CD-ROM (Compact Disc Read Only Memory), an MO (Magnetooptical) disk, a DVD (Digital Versatile Disc), a magnetic disk, or a semiconductor memory. A removable storage medium on which the program is stored may be provided as so-called packaged software thereby allowing the program to be installed on the robot (memory 10B).

The program may also be installed into the memory 10B by downloading the program from a site via a digital broadcasting satellite and via a wireless or cable network such as a LAN (Local Area Network) or the Internet.

In this case, when the program is upgraded, the upgraded program may be easily installed in the memory 10B.

In the present invention, the processing steps described in the program to be executed by the CPU 10A for performing various kinds of processing are not necessarily required to be executed in time sequence according to the order described in the flow chart. Instead, the processing steps may be performed in parallel or separately (by means of parallel processing or object processing).

The program may be executed either by a single CPU or by a plurality of CPUs in a distributed fashion.

The voice synthesis unit 55 shown in FIG. 5 may be realized by means of dedicated hardware or by means of software. When the voice synthesis unit 55 is realized by software, a software program is installed on a general-purpose computer or the like.

Figure 8:
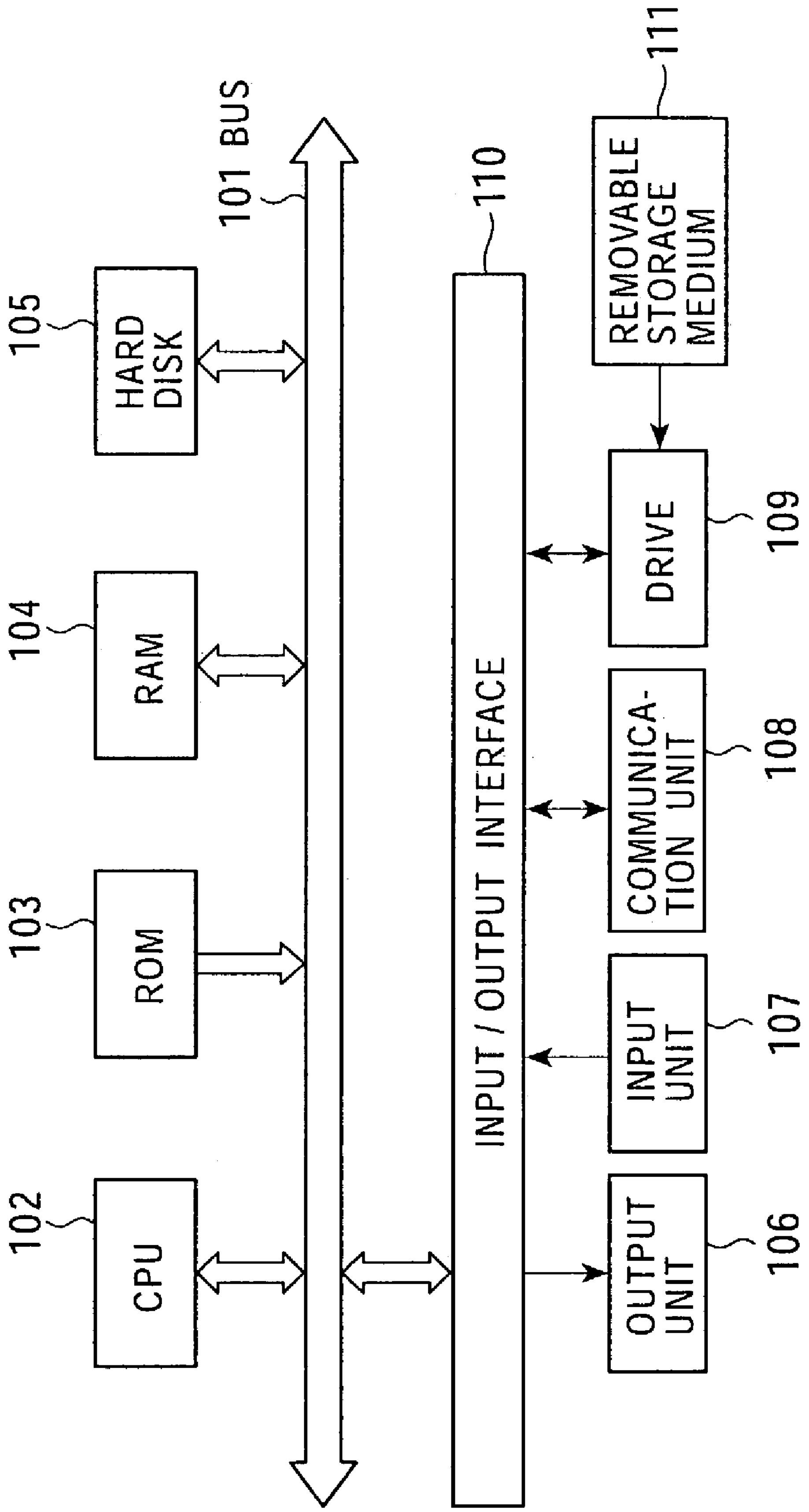
FIG. 8 is a block diagram showing an example of a construction of a computer according to an embodiment of the present invention.

FIG. 8 illustrates an embodiment of the invention in which the program used to realize the voice synthesis unit 55 is installed on a computer.

The program may be stored, in advance, on a hard disk 105 serving as a storage medium or in a ROM 103 which are disposed inside the computer.

Alternatively, the program may be stored (recorded) temporarily or permanently on a removable storage medium 111 such as a floppy disk, a CD-ROM, an MO disk, a DVD, a magnetic disk, or a semiconductor memory. Such a removable storage medium 111 may be provided in the form of so-called package software.

Instead of installing the program from the removable storage medium 111 onto the computer, the program may also be transferred to the computer from a download site via a digital broadcasting satellite by means of wireless transmission or via a network such as an LAN (Local Area Network) or the Internet by means of cable communication. In this case, the computer receives, using a communication unit 108, the program transmitted in the above-described manner and installs the received program on the hard disk 105 disposed in the computer.

The computer includes a CPU 102. The CPU 102 is connected to an input/output interface 110 via a bus 101 so that when a command issued by operating an input unit 107 such as a keyboard or a mouse is input via the input/output interface 110, the CPU 102 executes the program stored in a ROM 103 in response to the command. Alternatively, the CPU 102 may execute a program loaded in a RAM (Random Access Memory) 104 wherein the program may be loaded into the RAM 104 by transferring a program stored on the hard disk 105 into the RAM 104, or transferring a program which has been installed on the hard disk 105 after being received from a satellite or a network via the communication unit 108, or transferring a program which has been installed on the hard disk 105 after being read from a removable recording medium 111 loaded on a drive 109, By executing the program, the CPU 102 performs the process described above with reference to the flow chart or the process described above with reference to the block diagrams. The CPU 102 outputs the result of the process, as required, to an output unit 106 such as an LCD (Liquid Crystal Display) or a speaker via the input/output interface 110. The result of the process may also be transmitted via the communication unit 108 or may be stored on the hard disk 105.

Although in the embodiments described above, a voice (reaction voice) is output in response to a stimulus, a reaction other than reaction voices may be performed (output) in response to a stimulus. For example, the robot may nod or shake the head or may wag its tail in response to a stimulus.

Although in the example of the reaction table shown in FIG. 6, the correspondence between stimuli and reactions is described, the correspondence between other parameters may also be described. For example, the correspondence between changes in stimulus (for example, changes in strength of stimulus) and reactions may be described.

Furthermore, although in the embodiments described above, a synthesized voice is produced by means of by-rule voice synthesis, a synthesized voice may also be produced by a method other than the by-rule voice synthesis.

INDUSTRIAL APPLICABILITY

According to the present invention, as described above, a voice is output under the control of the information processing apparatus. The outputting of the voice is stopped in response to a particular stimulus, and a reaction corresponding to the particular stimulus is output. Thereafter, the outputting of the stopped voice is resumed. Thus, the voice is output in a very natural manner.

The invention claimed is:

1. A voice output apparatus for outputting a voice, comprising:

voice output means for outputting a voice under the control of an information processing apparatus;

stopping means for stopping outputting the voice in response to a particular stimulus;

reaction output means for outputting a reaction in response to the particular stimulus; and resuming means for resuming outputting the voice stopped by the stopping means.

2. A voice output apparatus according to claim 1, wherein said particular stimulus is a sound, light, time, temperature, or pressure.

3. A voice output apparatus according to claim 2, further comprising detection means for detecting the sound, light, time, temperature, or pressure applied as said particular stimulus.

4. A voice output apparatus according to claim 1, wherein said particular stimulus is an internal status of the information processing apparatus.

5. A voice output apparatus according to claim 4, wherein said information processing apparatus is a real or virtual robot; and said particular stimulus is a state of emotion or instinct of the robot.

6. A voice output apparatus according to claim 1, wherein said information processing apparatus is a real or virtual robot; and said particular stimulus is a state of the attitude of the robot.

7. A voice output apparatus according to claim 1, wherein said resume means resumes outputting the voice from the point at which the outputting was stopped.

8. A voice output apparatus according to claim 1, wherein said resume means resumes outputting the voice from a specific point shifted back from the point at which the outputting was stopped.

9. A voice output apparatus according to claim 8, wherein said resume means resumes outputting the voice from a specific point shifted back from the point at which the outputting was stopped, said specific point being a boundary between information segments.

10. A voice output apparatus according to claim 9, wherein said resume means resumes outputting the voice from a specific point shifted back from the point at which the outputting was stopped, said specific point being a boundary between words.

11. A voice output apparatus according to claim 9, wherein said resume means resumes outputting the voice from a specific point shifted back from the point at which the outputting was stopped, said specific point corresponding to a punctuation.

12. A voice output apparatus according to claim 9, wherein said resume means resumes outputting the voice from a specific point shifted back from the point at which the outputting was stopped, said specific point corresponding to the beginning of a breathing pause.

13. A voice output apparatus according to claim 1, wherein said resume means resumes outputting the voice from a specific point designated by a user.

14. A voice output apparatus according to claim 1, wherein said resume means resumes outputting the voice from the beginning of the voice.

15. A voice output apparatus according to claim 1, wherein in a case in which the voice corresponds to a text, said resume means resumes outputting the voice from the beginning of the text.

16. A voice output apparatus according to claim 1, wherein after said reaction output means has outputted the reaction in response to the particular stimulus, said reaction output means further outputs a predetermined and fixed reaction.

17. A voice output apparatus according to claim 1, wherein said reaction output means outputs a reaction by means of a voice in response to the particular stimulus.

18. A voice output apparatus according to claim 1, further comprising stimulus recognition means for recognizing a meaning of the particular stimulus on the basis of the output from the detection means for detecting the particular stimulus.

19. A voice output apparatus according to claim 18, wherein said stimulus recognition means recognizes the meaning of the particular stimulus on the basis of the detection means which has detected the particular stimulus.

20. A voice output apparatus according to claim 18, wherein said stimulus recognition means recognizes the meaning of the particular stimulus on the basis of the strength of the particular stimulus.

21. A method of outputting a voice, comprising the steps of:

outputting a voice under the control of an information processing apparatus;

stopping outputting the voice in response to a particular stimulus;

outputting a reaction in response to the particular stimulus; and resuming outputting the voice stopped in the stopping step.

22. A program for causing a computer to perform a process of outputting a voice, comprising the steps of:

outputting a voice under the control of an information processing apparatus;

stopping outputting the voice in response to a particular stimulus;

outputting a reaction in response to the particular stimulus; and resuming outputting the voice stopped in the stopping step.

23. A storage medium on which a program for causing a computer to perform a process of outputting a voice, said program comprising the steps of:

outputting a voice under the control of an information processing apparatus;

stopping outputting the voice in response to a particular stimulus;

outputting a reaction in response to the particular stimulus; and resuming outputting the voice stopped in the stopping step.

* * * * *